United States Patent [19]

Mowrer et al.

[11] Patent Number: 5,487,692
[45] Date of Patent: Jan. 30, 1996

[54] EXPANDABLE WHEEL ASSEMBLY

[75] Inventors: Kevin B. Mowrer, Loveland; Robert L. Beck, Cincinnati, both of Ohio

[73] Assignee: Tonka Corporation, Pawtucket, R.I.

[21] Appl. No.: 315,718

[22] Filed: Sep. 30, 1994

[51] Int. Cl.$^6$ ................................................. A63H 17/00
[52] U.S. Cl. ........................ 446/465; 446/462; 446/448; 440/92
[58] Field of Search ........................... 446/465, 466, 446/437, 448, 462, 457, 289, 290, 236, 253; 301/40.1, 41.1; 440/92, 100, 90

[56] References Cited

U.S. PATENT DOCUMENTS

| | | | |
|---|---|---|---|
| 149,596 | 4/1874 | Morris | 446/253 |
| 849,619 | 4/1907 | Jackson | 446/253 |
| 1,145,086 | 7/1915 | Secor | 446/253 |
| 1,321,836 | 11/1919 | McKenna | 446/253 |
| 1,631,539 | 6/1927 | Larrair | 446/253 |
| 1,997,115 | 4/1935 | Merz et al. . | |
| 2,650,632 | 9/1953 | Langdon . | |
| 3,182,705 | 5/1965 | Markow . | |
| 3,394,748 | 7/1968 | Koshi . | |
| 3,517,721 | 6/1970 | Woodhall . | |
| 3,606,920 | 9/1971 | Kole . | |
| 3,646,706 | 3/1972 | Adickes . | |
| 4,266,832 | 5/1981 | Delaunay et al. . | |
| 4,459,776 | 7/1984 | Jaworski et al. . | |
| 4,467,557 | 8/1984 | Kuna et al. . | |
| 4,547,173 | 10/1985 | Jaworski et al. . | |
| 4,601,519 | 7/1986 | D'Andrade . | |
| 4,643,696 | 2/1987 | Law | 446/465 |
| 4,648,853 | 3/1987 | Siegfried | 446/448 |
| 4,773,889 | 9/1988 | Rosenwinkel et al. . | |
| 5,102,367 | 4/1992 | Mullaney et al. | 446/465 |
| 5,171,181 | 12/1992 | Freeman . | |
| 5,267,888 | 12/1993 | Hippely et al. | 446/465 |

FOREIGN PATENT DOCUMENTS

| | | |
|---|---|---|
| 965886 | 12/1948 | France . |
| 55078984 | 11/1978 | Japan . |
| 55078982 | 11/1978 | Japan . |
| 1290857 | 9/1972 | United Kingdom . |

OTHER PUBLICATIONS

Spinner Toy speciman as disclosed in *Freeman*; undated.
Spinner Toy speciman of "Orbiter", undated.

*Primary Examiner*—Robert A. Hafer
*Assistant Examiner*—Michael O'Neill
*Attorney, Agent, or Firm*—Marshall, O'Toole, Gerstein, Murray & Borun

[57] ABSTRACT

An expandable wheel assemble for toy vehicles includes an axle, a first hub fixed to the axle, a second hub supported by the axle, and at least one web that spans between and is joined to the hubs, and has a central portion movable outwardly from the axle due to centrifugal force when the wheel assembly is rotated.

25 Claims, 4 Drawing Sheets

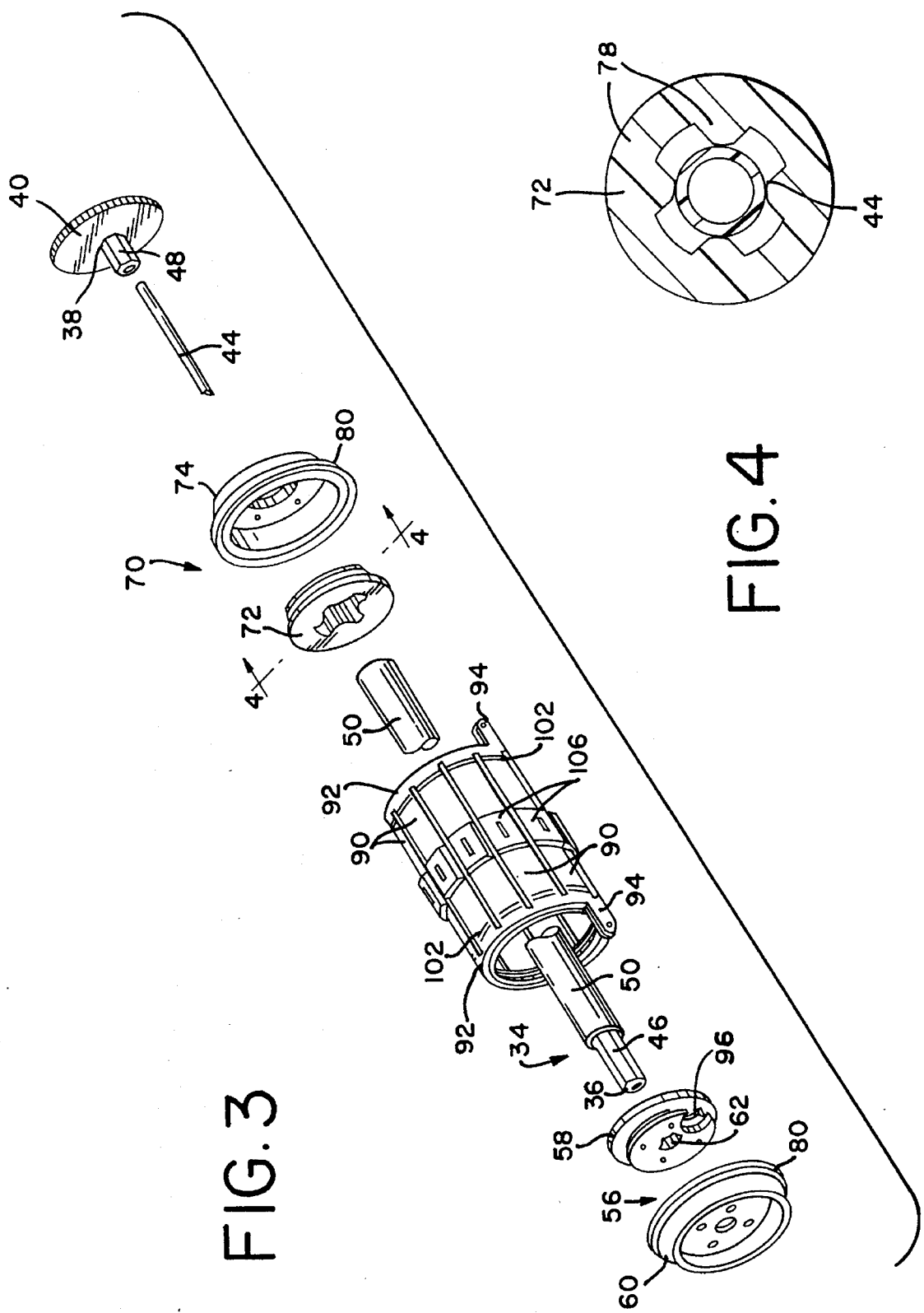

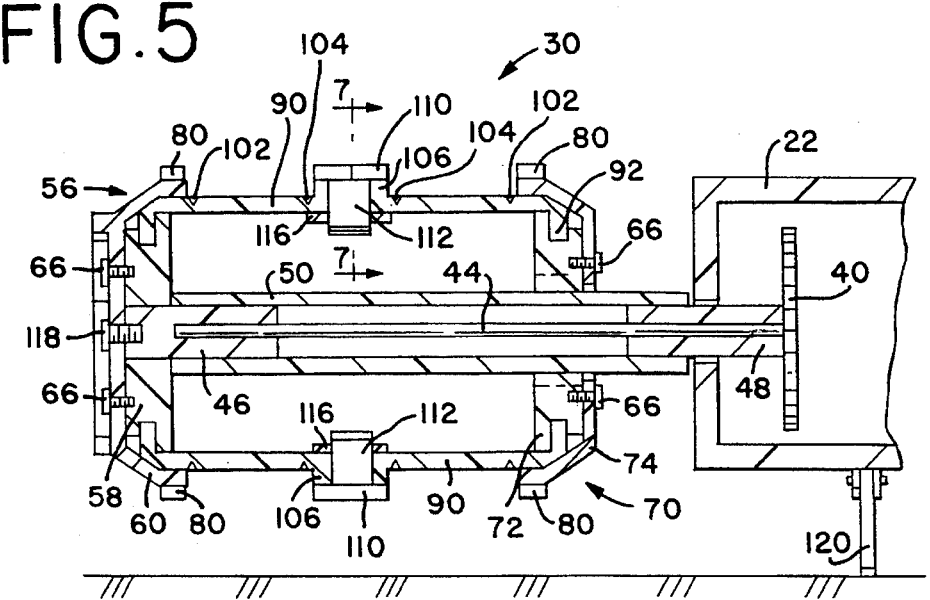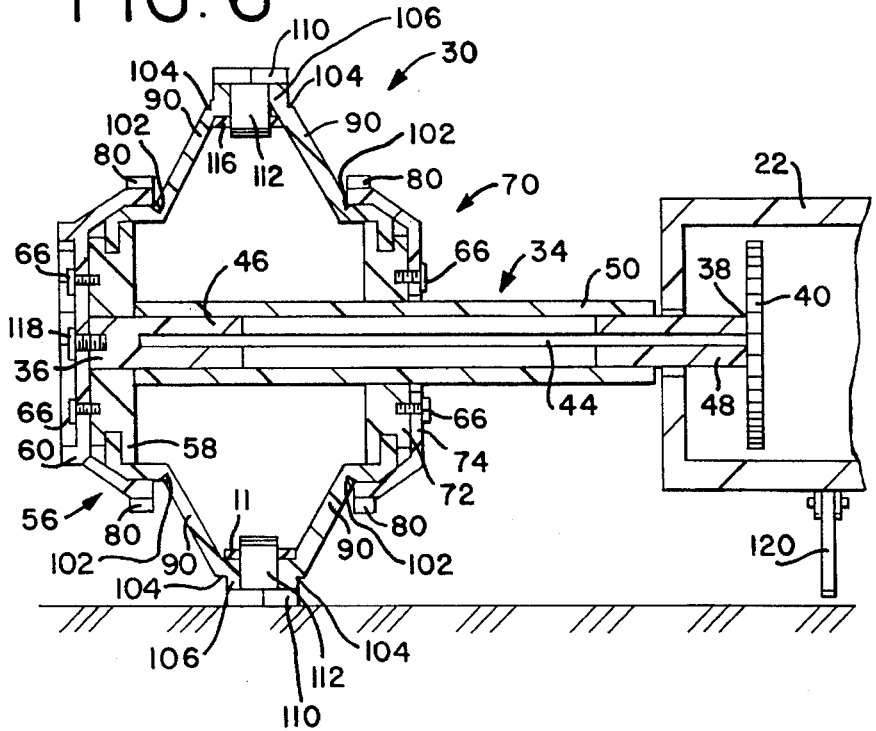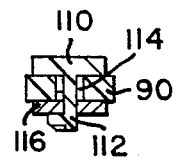

FIG. 8
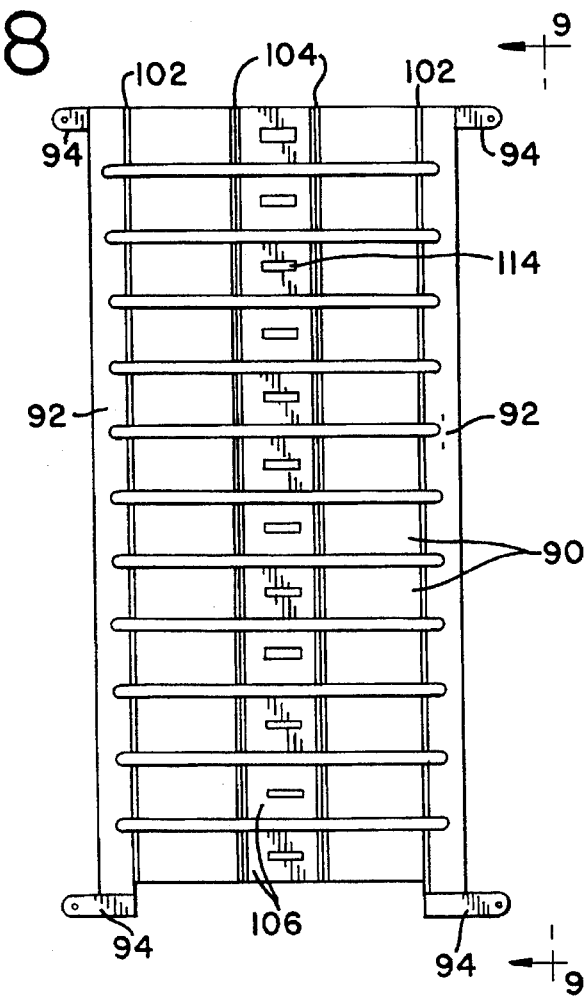
FIG. 9
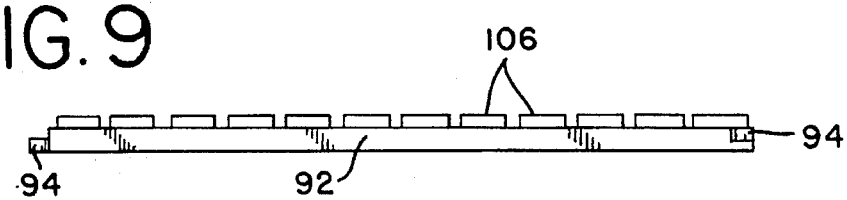
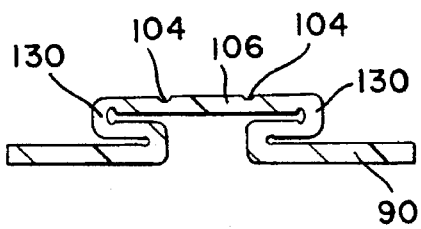
FIG. 10
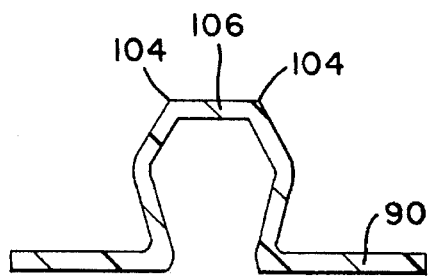
FIG. 11

EXPANDABLE WHEEL ASSEMBLY

BACKGROUND OF THE INVENTION

This invention relates generally to wheel assemblies for toy vehicles and particularly to a wheel that expands when accelerated or run at a high rate of speed.

Wheel extensions and expandable wheels of various types are known that provide added traction or wheel diameter to overcome obstacles or to simply change the appearance of the vehicle. To extend projections from the wheels or expand the diameter of the wheel itself, actuators were used that include gear mechanisms or camming means such as those disclosed in U.S. Pat. Nos. 4,773,889 and 4,601,519. Thus, it is desirable to have a wheel that expands when little or no resistance is applied to the vehicle or wheel assembly and without a complicated mechanism to effect the change.

SUMMARY OF THE INVENTION

A wheel assembly in accordance with the present invention expands in response to centrifugal force that results from rapid acceleration or high rates of speed. Such a wheel assembly includes an axle having a first end and a second end; a first hub joined to the axle at or near the first end; a second hub supported by the axle; and a web spanning between and joined to the first hub and the second hub, having a central portion movable outwardly from the axle in response to centrifugal force induced by rotation of the wheel assembly.

BRIEF DESCRIPTION OF THE DRAWINGS

FIG. 3 is an exploded perspective view of a wheel assembly in accordance with the present invention;

FIG. 4 is a cross-sectional view of a hub component of the wheel assembly taken along line 4—4 in FIG. 3;

FIG. 5 is a cross-sectional view of the wheel assembly in an unexpanded mode;

FIG. 6 is a cross-sectional view of the wheel assembly in an expanded mode;

FIG. 7 is a cross-sectional view of a traction pad assembly taken along line 7—7 in FIG. 5;

FIG. 8 is a plan view of a sheet of flexible webs useful in the wheel assembly of the present invention;

FIG. 9 is an elevational view of the web sheet of FIG. 8 as viewed from line 9—9;

FIG. 10 is a cross-sectional view of an alternative web configuration in accordance with the present invention; and FIG. 11 is the web of FIG. 10 in an expanded mode.

DETAILED DESCRIPTION OF THE DRAWINGS

To the extent reasonable and practical, the same elements which appear in the various figures will be identified by the same reference number.

Figure 1:
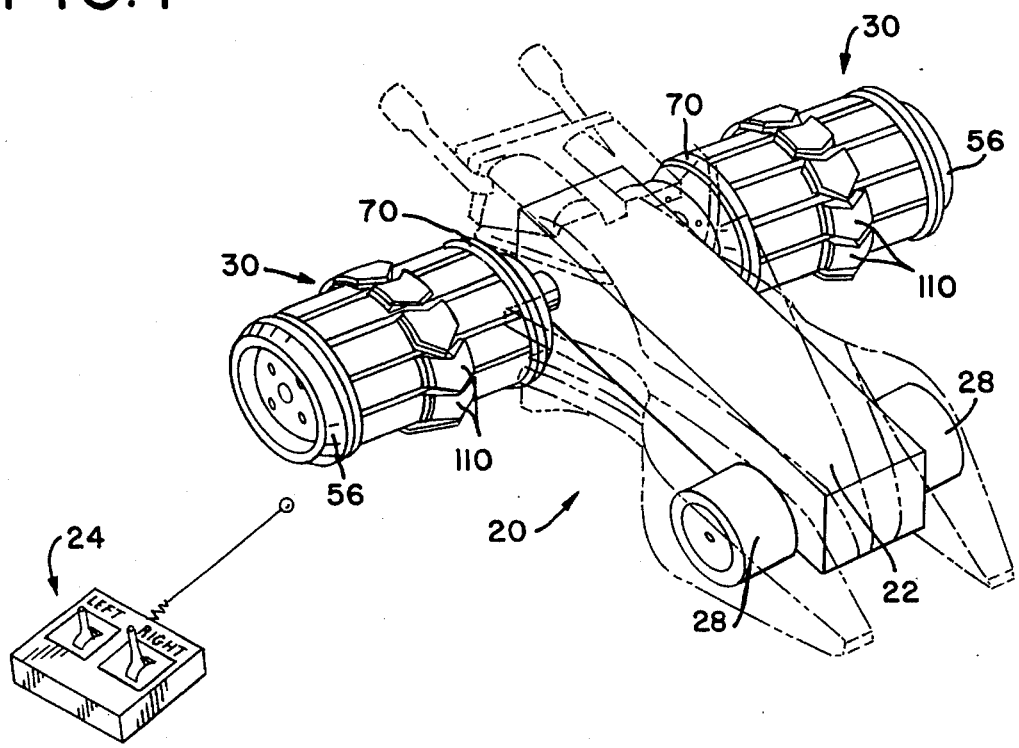
FIG. 1 is a perspective view of a toy vehicle including a pair of expandable rear wheel assemblies in accordance with the present invention.
Figure 2:
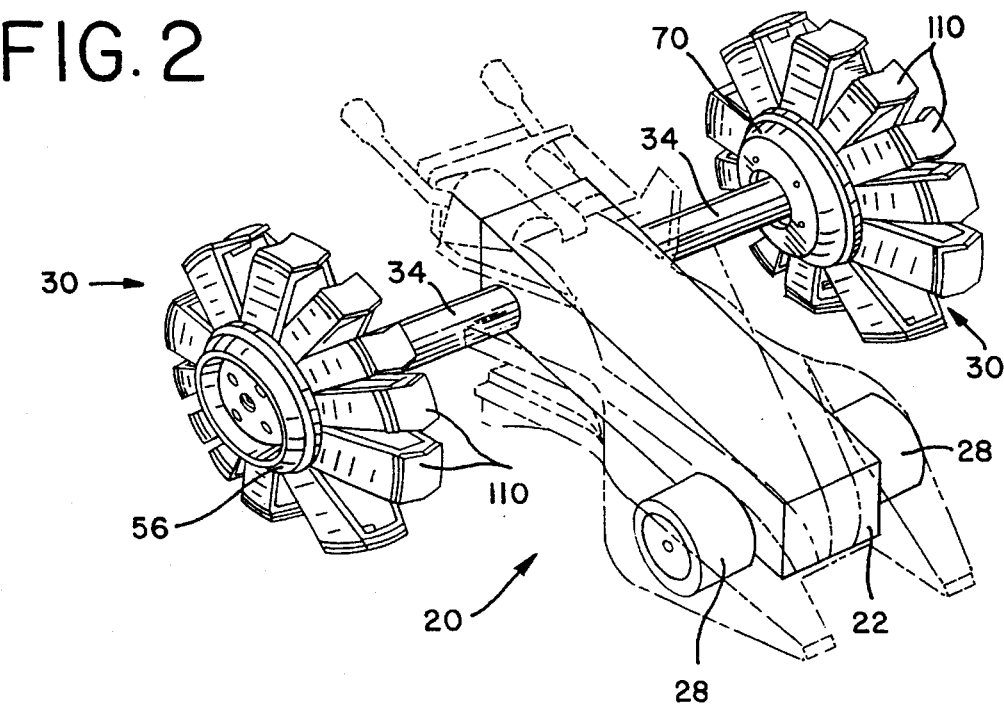
FIG. 2 is a perspective view of the vehicle in FIG. 1 with the rear wheel assemblies in an expanded mode.

FIGS. 1 and 2 illustrates a remotely controlled toy vehicle 20 including a chassis 22 and any suitable on-board motor (not illustrated) which is preferably battery powered and capable of reversing directions such as Mabuchi series 260 or 280 motors. A hand-held dual joy stick remote control device 24 is also illustrated as a preferred mode for operating the vehicle 20 from a distance and for activating at least two wheels independently of one another.

The vehicle 20 includes a pair of front wheels 28 and a pair of rear wheel assemblies 30. The front wheels 28 of the illustrated embodiment are standard toy wheels that do not receive any power from the motor to drive the vehicle 20. In alternative embodiments, the front wheels 28 could be used to drive the vehicle 20 and could be replaced with the rear wheel assemblies 30 described below. Further, the vehicle can be a boat on which wheel assemblies 30 act as paddle wheels to propel the boat in water.

The illustrated left and right rear wheel assemblies 30 are essentially the same and can be driven in the forward or reverse direction or separately by the dual joy stick remote control 24 to enable the vehicle 20 to turn and travel in reverse. Each wheel assembly 30 includes essentially the same components and both are represented in the single embodiment illustrated in FIGS. 3 through 9. An axle is generally indicated by reference numeral 34 and includes various component parts to define a free end 36, and an end 38 proximate the vehicle chassis 22. The proximate end 38 engages a drive gear 40 which is operatively positioned within the vehicle chassis 22 and meshed with the motor to transfer power to the axle 34.

The illustrated axle 34 includes a metal rod 44 press-fit into the drive gear 40 and extending horizontally outward from the side of the vehicle chassis 22. The rod 44 is also press-fit into a free end hex bushing 46 and a proximate hex bushing 48. In this configuration the rod 44 extends most of the length of the wheel assembly 30, the free end hex bushing 46 is at the free end of the rod 44, and the proximate hex bushing 48 is at the end of the rod 44 and extends into the vehicle chassis 22 to be adjacent the drive gear 40 (FIG. 5).

Fitted over the rod and bushings is a hollow shaft 50 having a smooth, low-friction outer surface and a hex-shaped bore extending therethrough such that the hollow shaft 50 engages the hex bushings and rotates with the rod 44, hex bushings 46 and 48, and drive gear 40. The hollow shaft 50 is slightly shorter than the length of the rod and bushing assembly so that the free end hex bushing 46 partially extends beyond the free end of the hollow shaft 50.

On the portion of the free end hex bushing 46 that extends beyond the hollow shaft 50 there is fitted a fixed hub assembly 56 having an inner hub 58 and an outer hub 60. The inner hub 56 has a hex-shaped central opening 62 that fits over the hex bushing 46 for coaxial rotation therewith. The outer hub 60 is frustroconical in shape and slightly larger than the inner hub 58 such that the inner hub 56 can be nested in the outer hub 60 and the two can be secured together with four screws 66 or any other suitable means.

Between the proximate end 38 of the axle 34 and the fixed hub 56 there is positioned a second and proximate sliding hub assembly 70 having an inner hub 72 and an outer hub 74 that are shaped, fitted, and screwed together in a nesting manner similar to the fixed hubs 58 and 60.

The illustrated sliding hub assembly 70 is not joined directly to the axle 34 and is able to move between the proximate end of the axle 34 and the fixed hub assembly 56 because the sliding hub assembly 60 includes a central, low friction opening that will not engage the smooth outer surface of the hollow shaft 50. The hub opening preferably includes triangular spacers 78 (FIG. 4) directed inwardly such that their contact points maintain the concentric arrangement of the sliding hub assembly 70 and the axle 34 without exposing unnecessary hub surface area to the axle 35 that could cause excessive friction and restrict movement along the axle 34.

Both hub assemblies include an outer plastic or rubber traction ring 80 fitted over their peripheries to enhance traction of the wheel assemblies 30 when in the unexpanded mode and to minimize wear on the hubs. When used in water, the traction ring 80 may include fins to aid in propelling the vehicle 20.

Spanning the distance between the fixed hub assembly 56 and the sliding hub assembly 70 are a number of resilient webs 90 arranged substantially parallel to the axle and with a slight gap between them. The webs 90 are preferably joined to one another at their ends by integrally molded rims 92 for ease of assembly. The webs 90 are joined to the hub assemblies by placing the rims 92 between the inner and outer hubs and screwing the hubs together to clamp the webs 90 in place (FIGS. 5 and 6). Further, the webs 90 and rims 92 can be molded in a flat piece that is wrapped around the inner hubs to define a cylindrical tire (FIGS. 8 and 9). To secure the ends of the flat sheet of webs 90 to the inner hubs, tabs 94 are molded at the ends of the rims 92 and fitting into a matching recess 96 in the inner hubs. Suitable web 90 materials include Kraton and Hytrel.

The webs 90 experience a centrifugal force that tends to move them outwardly when the wheel assembly is rotated. Because the ends of the webs 90 are joined to the hubs, only the unrestrained, central portions of the webs 90 move outwardly from the axle 34 which results in the expansion of the wheel assembly 30 diameter. The webs 90 also transfer rotational forces from the fixed hub assembly 56 to the sliding hub assembly 70 since there is little frictional engagement between the sliding hub assembly 70 and the axle 34.

To provide bending of the webs 90 in desired configurations, the webs 90 may have a uniform cross-section and bend uniformly from end-to-end, or have joints in the form of transverse zones or notches of reduced web thickness molded or machined in the webs 90 to provide localized bending in the desired outward direction. Other suitable joints include pleats, hinges, and pivots. The webs 90 may be relatively rigid with bending only at the joints.

In the embodiment illustrated in FIGS. 1–9, outer joints 102 are formed in the webs 90 to be adjacent to the hub assemblies. A pair of spaced apart inner web joints 104 define a relatively flat contact zone 106 when the webs 90 bend outwardly. The illustrated contact zone 106 is further defined by an increased web thickness that adds mass which is subject to centrifugal force and tends to enhance the outward pull on the center of the webs 90 away from the axle 34.

Optional traction pads 110 can be secured to the contact zone 106 to provide increased mass, wear resistance, and either reduced or increased traction relative to the webs 90, as desired. The mass of the traction pads 110 is subject to web-bending centrifugal force. The pads are illustrated as being chevron-shaped and may be made of plastic rubber or other suitable materials. As illustrated FIGS. 5 through 7 traction pads 110 are secured to each web 90 with an integrally molded snap tab 112 pushed through web slot 114 and engaged to snap retainer 116 that prevents pull out.

In an alternative embodiment (not illustrated), the snap tab 112 or a similar component is provided with an extension so that the traction pad 110 is able to move outwardly from the axle 34 when centrifugal force is applied before being restrained by snap retainer 116. This embodiment of the traction pad 110 can be used with the webs 90 as they are illustrated herein or with a solid cylindrical web (not illustrated) so that the traction pad 110 is the only element that moves outwardly from the axle 34 to expand the effective diameter of the wheel assembly 30.

The webs 90 are also intended to exert a resilient force that tends to urge the sliding hub assembly 70 away from the fixed hub assembly 56. This resiliency is due to the web material and shape, as well as the clamping of the webs 90 between the inner and outer hubs of the hub assemblies which maintains the webs 90 in a flat or unexpanded mode when not in use or when running at a relatively low speed. Thus, the webs 90 tend to remain flat and urge the sliding hub assembly 70 away from the fixed hub assembly 56, and yet will bend outwardly to pull the sliding hub assembly 70 toward the fixed hub assembly 56 when sufficient centrifugal force is applied.

To enhance the effect of centrifugal force on the webs 90 it may be desirable to provide a resilient means such as a coil spring (not illustrated) positioned over the axle 34 and between the chassis 22 and the sliding hub assembly 70. The spring partially counteracts the resilient force of the webs 90 which would otherwise need to be overcome by centrifugal force. In this manner, the central portion of the webs 90 will move outwardly at lower velocities.

The hub assemblies and webs are removably mounted to the axle 34 by screw 118 so that the assembly can be cleaned.

When the wheel assembly 30 described above is mounted on a vehicle chassis 22 and the motor is activated, drive gear 40 applies a torque to rotate the axle 34, fixed hub assembly 56, webs 90, and the sliding hub assembly 70. This torque-induced rotation causes a centrifugal force to act on the webs 90, the thick contact zone 106, and the traction pads 110, which pulls the central portions of the webs 90 away from the axle 34 which in turn pulls the sliding hub assembly 70 toward the fixed hub assembly 56 and results in the diameter of the wheel assembly 30 expanding. This effect is enhanced when the wheel assemblies 30 are on a smooth or gravel surface where gaining traction is difficult because the wheel assemblies 30 accelerate much more quickly with a greater centrifugal force to mimic a drag racer's rear wheels.

Shortly after the vehicle 20 begins to move and the wheel assemblies 30 obtain full traction with the play surface, the weight of the vehicle 20 and the resilient force exerted by the webs 90 overcomes some of the torque that is applied by the motor and urges the sliding hub assembly 70 back toward the chassis 22, but some nominal expansion of the wheel assembly diameter will remain. Further, any obstacles in the path of the vehicle 20 will slow it down and also cause the diameter of the wheel assemblies 30 to move toward their unexpanded mode.

As the vehicle 20 builds speed, the centrifugal forces acting on the wheel assemblies 30 eventually cause greater expansion and the vehicle 20 will travel indefinitely on expanded wheel assemblies as illustrated in FIG. 2. One effect of the wheel expansion is to increase the vehicle speed because the larger wheel diameter transfers more linear velocity from a given axle rotational velocity.

When the wheel assembly 30 is mounted on a boat in water it operates to propel the boat through the water. When the wheel assembly 30 accelerates or reaches a high rate of rotation it will expand as described above and cause a "rooster tail" of water spray behind the boat. Naturally, web shapes orientations, and configurations will affect operation in water and one skilled in the art will be able to produce desired results in view of the teachings herein.

FIGS. 5 and 6 illustrate the chassis 22 of FIG. 1 with the addition of a kick stand 120 that raises the rear wheel assemblies 30 up to permit their unresisted rotation. When the wheel assemblies 30 expand enough to make contact with the play surface (FIG. 6) the vehicle accelerates rapidly. The kick stand 120 is pivotally connected to the underside of the chassis 22 so that it pivots upward and rearward when the vehicle 20 moves forward.

FIGS. 10 and 11 illustrate an alternative web configuration 90 having first and second pleats 130 which permit movement of the central portion of the web 90 outwardly from the axle 34 due to centrifugal force when the wheel assembly 30 is rotated (FIG. 11). This web configuration 90 can be used with the wheel assembly 30 components described above or with two fixed hub assemblies because the web 90 will move outwardly without one hub moving closer to the other. Further, using this configuration, a single cylindrical web can be used in place of the multiple webs 90 illustrated in FIGS. 1 through 9, for example.

The foregoing detailed description has been given for clearness of understanding only, and no unnecessary limitations should be understood therefrom, as modifications will be obvious to those skilled in the art.

We claim:

1. A wheel assembly for use with a toy vehicle comprising:

an axle having a first end and a second end;

a first hub fixed to the axle proximate the first end;

a second hub supported by the axle and movable between the second end of the axle and the first hub, the second hub including a plurality of inwardly directed and substantially triangular-shaped points having means for maintaining coaxial alignment of the second hub and the axle; and a plurality of webs spanning between and joined to the first hub and the second hub and each web having a central portion; and wherein the axle, the first hub, the second and movable hub, and the webs are included in means for moving the central portions of the webs outward from the axle in response to centrifugal force induced by rotation of the wheel assembly.

2. The wheel assembly of claim 1 in which the webs comprise:

means for sliding the second hub toward the first hub in response to centrifugal force by the rotation of the wheel assembly.

3. The wheel assembly of claim 1 in which the means for moving the central portions of the webs outward further comprises:

means for bending the webs outwardly from the axle.

4. The wheel assembly of claim 1 in which the webs are resilient.

5. The wheel assembly of claim 1 in which in webs comprise:

means for urging the second hub away from the first hub.

6. The wheel assembly of claim 1 in which the means for moving the central portions of the webs outward further comprises:

joint means integral with the webs for bending when the central portions of the webs move outward from the axle.

7. The wheel assembly of claim 1 in which the means for moving the central portions of the webs outward further comprises:

a transverse zone of reduced web thickness that bends as the central portions of the webs move outwardly.

8. The wheel assembly of claim 1 in which the webs comprise:

a zone of additional mass for enhancing outward movement of the central portions of the webs due to centrifugal force.

9. The wheel assembly of claim 1 in which the webs each comprise:

first and second spaced apart joint means for bending and defining a play surface contact zone therebetween when the central portion of the webs move outwardly from the axle.

10. The wheel assembly of claim 1 in which the webs each comprise:

first and second spaced apart joint means for bending and defining a play surface contact zone therebetween when the central portion of the web moves outwardly from the axle; and a traction pad joined to the contact zone of web.

11. The wheel assembly of claim 1 in which the means for moving the central portions of the webs outward further comprises:

means for moving the second hub toward the first hub.

12. The wheel assembly of claim 1 in which the hubs each comprise:

inner and outer nesting portions between which the ends of the webs are secured.

13. A motorized toy vehicle comprising:

a chassis;

a drive mechanism carried by the chassis;

an axle rotatably joined to the drive mechanism, the axle comprising a first end and a second end;

a first hub fixed to the axle proximate the first end;

a second hub supported by the axle and movable between the second end of the axle and the first hub, the second hub including a plurality of inwardly directed and substantially triangular-shaped points having means for maintaining coaxial alignment of the second hub and the axle; and a plurality of webs spanning between and joined to the first hub and the second hub, and each web having a central portion;

wherein the axle, the first hub, the second and movable hub, and the webs are included in means for moving the central portions of the webs outward from the axle in response to centrifugal force induced by rotation of the axle.

14. The vehicle of claim 13 in which the webs each comprise:

means for sliding the second hub toward the first hub in response to centrifugal force induced by rotation of the axle.

15. The vehicle of claim 13 in which the means for moving the central portions of the webs outward further comprises:

means for bending the webs outwardly from the axle.

16. The vehicle of claim 13 in which the webs are resilient.

17. The vehicle of claim 13 in which the webs each comprise:

means for urging the second hub away from the first hub.

18. The vehicle of claim 13 in which the means for moving the central portions of the webs outward further comprises:

joint means integral with the webs for bending when the central portions of the webs move outward from the axle.

19. The vehicle of claim 13 in which the means for moving the central portions of the webs outward further comprises:

a transverse zone of reduced web thickness that bends as the central portions of the webs move outwardly.

20. The vehicle of claim 13 in which the webs each comprise:

a zone of additional mass for enhancing outward movement of the central portion of the web due to centrifugal force.

21. The vehicle of claim 13 in which the webs each comprise:

first and second spaced apart joint means for bending and defining a play surface contact zone therebetween when the central portion of the web moves outwardly from the axle.

22. The vehicle of claim 13 in which the webs each comprise:

first and second joint means for bending and defining a play surface contact zone therebetween when the central portion of the web moves outwardly from the axle; and a traction pad joined to the contact zone of the web.

23. The vehicle of claim 13 in which the means for moving the central portions of the webs outward further comprises:

means for moving the second hub toward the first hub.

24. The vehicle of claim 13 in which the hubs each comprise:

inner and outer nesting portions between which the ends of the webs are secured.

25. A toy vehicle having a wheel assembly comprising:

an axle having a first end and a second end;

a first hub fixed to the axle proximate the first end;

a second hub supported by the axle;

a web spanning between and joined to the first hub and the second hub and having a central portion; and means responsive to centrifugal force induced by rotation of the wheel assembly for moving the central portion of the web outward, the means responsive to centrifugal force including:

a zone of additional mass proximate the central portion of the web;

first and second spaced apart joint means for bending and defining a play surface contact zone therebetween;

a traction pad joined to the central portion of the web; and means for sliding the second hub toward the first hub to accommodate outward movement of the central portion of the web.

\* \* \* \* \*